Aug. 27, 1957  E. J. DAVID  2,803,931
SCORING OR PERFORATING ATTACHMENT FOR PACKAGE-SEALING ROLLS
Filed March 24, 1954
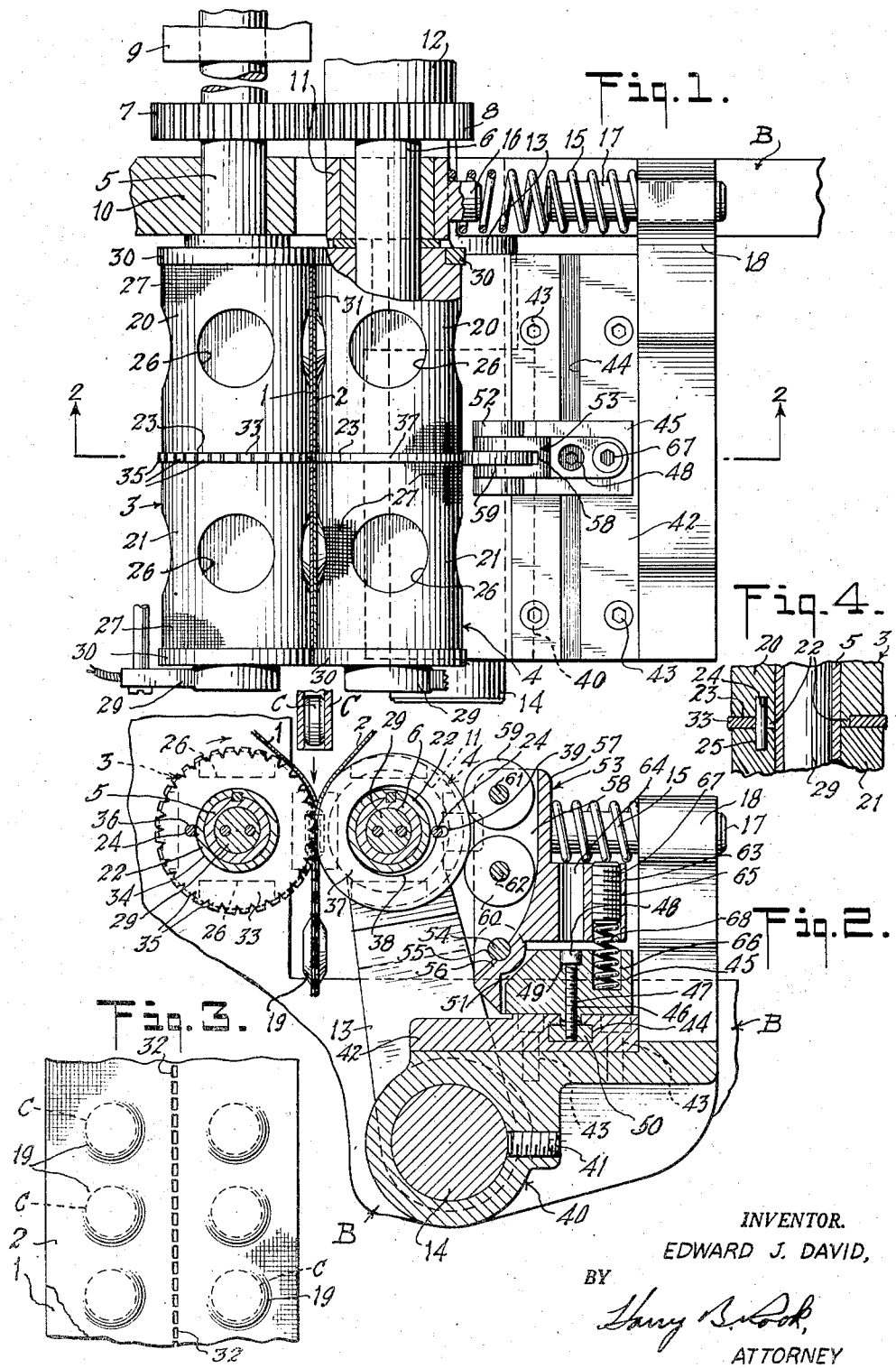
INVENTOR.
EDWARD J. DAVID,
BY
*Harry B. Cook,*
ATTORNEY

United States Patent Office 2,803,931
Patented Aug. 27, 1957

2,803,931

SCORING OR PERFORATING ATTACHMENT FOR PACKAGE-SEALING ROLLS

Edward J. David, Hillside, N. J., assignor to Ivers-Lee Company, Newark, N. J., a corporation of Delaware Application March 24, 1954, Serial No. 418,434

7 Claims. (Cl. 53—178)

This invention relates in general to packaging machines of the type which includes rollers that are adapted to receive and seal and crimp between them two or more opposed layers or webs of flexible packaging material so as to form a plurality of rows of commodity-containing compartments between said layers in a continuous strip which can be divided transversely between said compartments to form groups of packages.

A prime object of the present invention is to provide a novel and improved attachment for such sealing rollers, for scoring or for forming a line of perforations longitudinally of the strip between the rows of commodity-containing compartments.

Another object is to provide such an attachment which shall comprise a toothed perforating ring carried by one of the rollers and a platen ring or disc carried by the other roller and having a cylindrical, smooth peripheral surface coacting with said toothed perforating ring for scoring or perforating the strip of packaging material, said platen ring being yieldingly pressed independently of the rollers into contact with the periphery of the toothed perforating ring to ensure accurate and uniform scoring or perforation of the packing material.

A further object is to provide in combination with such a perforating ring and platen ring, novel and improved means for constantly yieldingly urging the platen ring into cooperative relation to perforating ring and adapted to cooperate effectively with rollers having the perforating ring and platen ring located at different positions longitudinally of the rollers and to coact with platen rings and perforating rings for rollers of different diameters.

Other objects, advantages and results will be brought out by the following description in conjunction with the accompanying drawings in which—

Figure 1 is a top plan view of one form of packaging machine embodying my invention, with portions being broken away and shown in horizontal section.

Figure 2 is a sectional view taken on the plane of the line 2—2 of Figure 1.

Figure 3 is a front view of a portion of one type of package for the manufacture of which the machine may be utilized.

Figure 4 is a fragmentary horizontal sectional view showing the joint between roller sections and the mounting of the perforating disc thereat.

Referring particularly to Figures 1 and 2 of the drawing, the reference characters 1 and 2 designate two layers or strips of packaging material, for example, "Pliofilm," "cellophane," metal foil, paper or the like, but preferably thermoplastic material or materials having a thermoplastic coating on one side thereof so that the two layers can be secured together under simultaneous application of heat and pressure. These strips are led from a suitable source of supply to a sealing and crimping mechanism which includes sectioned rollers 3 and 4 that receive the layers between them.

Each roller 3 and 4 frictionally contacts with one of the layers 1 and 2 so as to press said layer into contact with the other layer, the rollers being mounted to rotate on approximately parallel axes by the respective shafts 5 and 6 which are geared together by spur gears 7 and 8 so that the rollers will rotate in opposite directions. One of the shafts, in the present instance, shaft 5, is driven from any suitable source of power. The shafts may be mounted in any suitable manner but as shown the shaft 5 is journaled in bearings 9 and 10 which may form a part of the main frame of the packaging machine, while the shaft 6 is journaled in two bearings 11 and 12 that preferably are connected integrally on the end of a lever arm 13 which is pivotally mounted on a shaft 14 on the frame B of the machine so that the roller 4 may move toward and from the roller 3. Preferably a compression spring 15 is interposed between the bearing 11 and the frame B of the machine, with one end, encircling a stud 16 formed integrally on the bearing 11, and being seated against the bearing, and its other end encircling a pin 17 carried by a bracket 18 on the frame and impinging against said frame so as to normally influence the rollers into peripheral contact with each other.

The rollers as shown are specifically designed to manufacture a composite package structure for packaging a plurality of individual articles in association with each other to form a package strip like that shown in Figure 3, which comprises two pieces 1 and 2 of packaging material sealed together in areas bounding unsealed zones to form two rows of article receiving compartments 19 in which articles, such as tablets c, may be packaged. The rollers 3 and 4 are each composed of a pair of tubular aligned roller sections 20 and 21. Each section 20 is formed with an annular flange forming a shoulder 22 on the meeting end face thereof, around its axial opening, which abuts against the adjacent end face of section 21 thereby providing a circumferential groove or space 23 between the adjacent end faces of the sections for a purpose which will be later described. The sections 20 and 21 of each roller are secured together by a dowel pin 24 fastened in the end face of section 20 and fitted into a socket recess 25 in the end face of the other section 21.

The roller sections 20 and 21 have complemental registering recesses 26 to provide clearance space between them for the articles c that are disposed between the layers of packaging material, the shape of the recesses corresponding to the shape of the compartment. The recesses are surrounded on the peripheral surfaces of the rollers by roughened, corrugated or serrated zones 27 for crimping or corrugating and pressing together the layers 1 and 2 to form the compartments 19 of the packages.

Where the material of the layers is heat-sealable, the rollers are heated by suitable electric heating devices 29, of known character, for example as shown in Patent 2,083,617, which heat the packaging material or the thermoplastic coating thereon at the same time pressure is applied to the layers by the serrated surfaces 27 and 27 of the rollers.

The articles c will of course be placed in the compartments 19 before the sealed portions of the packages are completed and any suitable article-depositing mechanism may be utilized. In the drawing, a discharge nozzle of such mechanism is designated at C and the article c may be dropped from this nozzle under control of suitable mechanism into the space between the layers 1 and 2 so that as the rollers rotate in the direction of the arrows shown in Figure 1, the articles will be enclosed between the layers of the material.

It is sometimes desirable to maintain a certain and uniform contact of the rollers with the layers of packaging material and further to ensure proper meshing or contact of the serrations or corrugations of the rollers with each other. For this purpose, a ring member 30 is mounted on the outer end of each of the roller sections 20 and 21, as described and claimed in Patent No. 2,374,504, dated April 24, 1945. This ring is mounted in a cut-away portion of the outer end surface of each section and is secured thereto by fastening members spaced therearound. The periphery of the ring projects beyond the periphery of the circumferential serrated portion 27 and the peripheries of the adjacent rings are adapted to contact each other as seen in Figure 1 leaving a space between the adjacent serrated surfaces as indicated at 31. This space is serrated surfaces as indicated at 31. This space is sufficient to receive the packaging material between the zones of contact of the roller sections and sufficient to permit the peripheral surfaces of the roller sections to accurately contact with each other throughout their lengths and with uniform and proper pressure along the zone of contact of the roller sections with the layers of packaging material so that the layers will be accurately and uniformly sealed together and crimped.

According to the present invention, a perforating or scoring attachment is associated with the rollers 3 and 4 for scoring or forming a line of perforations 32 through the strip longitudinally thereof between the rows of compartments 19 in order to facilitate division of the strip longitudinally along a line between the rows of compartments. This attachment includes a perforator in the form of a ring or annular disc 33 having a central opening 34 nicely fitted over the shoulder 22 on roller section 20 of roller 3 and disposed in the groove or space 23 between the roller sections 20 and 21 of said roller. The disc is formed with teeth 35 on its periphery and is rotated with the roller by the dowel pin 24 which extends through and engages the wall of a notch 36 formed in the inner periphery of the disc.

Another ring or annular disc 37 serving as a platen and having a center opening 38 is mounted on the shoulder 22 of the other roller 4 and is disposed in the groove or space 23 between the roller sections 20 and 21 of said roller 4. The central opening is larger in diameter than the diameter of the shoulder 22 so that there is a space for the disc to freely move transversely of the axis of the roller toward and away from the disc 33 on roller 3. The disc 37 is rotated with the roller 4 by the dowel pin 24 which extends through and engages the wall of a notch 39 formed in the inner periphery of the disc and which is elongated to permit said transverse movement of the disc. The outer periphery of the disc is cylindrical and smooth.

Provision is made for constantly urging the disc 37 toward the disc 33. For this purpose, a bracket 40 is secured to the shaft 14 of the frame B of the machine by a screw 41 at each end of the shaft. A plate 42 is fastened to the top of the bracket by screws 43 and is formed at its center with an undercut groove 44 for its length, serving as a trackway. A carriage in the form of an elongated block 45 is slidably mounted on the plate 42 by a screw 46 extending downwardly and loosely through a hole 47 in the block. The head 48 of the screw is seated in a counter-sunk portion 49 and at its bottom end the screw carries a nut 50 which is adapted to ride along the trackway provided by the central groove 44. The nut is adapted to engage the overhanging wall portions of the groove so that as the screw 46 is screwed into the nut, the carriage will be tightly clamped on the plate 42.

At one end, the block 45 is cutaway as indicated at 51 and is formed with perforated ear portions 52 at both sides of said cutaway portion which serve as bearings. A bell crank lever member 53 is pivotally mounted on the block by a pivot pin 54 extending across the cutaway portion and through openings 55 in an extension 56 formed on the lever member into the ear bearings 52. The long arm 57 of the lever member is formed with a slot 58 opening inwardly toward the roller 4 and upwardly as viewed in Figure 2. A pair of spaced upper and lower rollers 59 and 60, respectively, are mounted on pins 61 and 62 extending across the slot 58 and fixed in the side walls thereof. The rollers 59 and 60 are so arranged that their peripheries extend outwardly of the slot to engage the periphery of the disc 37 on the roller 4 on opposite sides of the line of contact of the discs 33 and 37.

The short arm 63 of the lever member is formed with inner and outer openings 64 and 65, respectively, extending therethrough, the inner opening being aligned with the countersunk portion 49 of the block 45 to provide access to the screw 46, and the outer opening being aligned with a socket recess 66 formed in the block. The outer opening 65 is internally screw threaded to receive a headless screw 67. A compression spring 68 seated in the recess 66 impinges and presses against the screw 67 thereby urging the lever member upwardly and around its pivot and yieldingly pressing the rollers 59 and 60 against the periphery of the disc 37 on roller 4. Uniform and proper contact of the discs 33 and 37 is thus ensured.

It will be apparent that when packaging material is fed through the perforator disc 33 and disc 37 between the rollers 3 and 4, such material will be penetrated by the teeth 35 on the disc 33 or scored by said teeth. The platen disc or ring 37 in effect floats between the sections of the roller 4 and is constantly yieldingly urged, independently of the roller 4, into contact with the peripheral teeth on the perforating disc or ring 33 by the spring 68, lever 57 and rollers 59, 60, so that accurate and uniform scoring or perforation of the package strip is ensured.

It will also be observed that the attachment will effectively cooperate with the platen rings of sealing rollers of different diameters, swinging of the lever 57 with appropriate adjustment of the spring adjusting screw 67 permitting the presser rollers 59, 60 to be moved toward or away from the axis of the sealing roller 4 to accommodate platen rings of different diameters.

Also by proper loosening of the screw 48 and sliding of the carriage 45 longitudinally of the groove 44 in the base plate 42, the rollers 59, 60 may be adjusted lengthwise of the rollers to cooperate with platen rings located at different positions longitudinally of the rollers.

What I claim is:

1. In a packaging machine, the combination with a pair of sealing rollers rotatably mounted about approximately parallel axes to receive and press layers of packaging material between them for sealing said layers together and means yieldingly pressing one of said rollers toward the other, of a cutter member coaxial with one of said rollers and having cutting edges on its periphery, means to cause rotation of said cutter member with said one roller, a platen member having a smooth cylindrical surface mounted to rotate with the other of said rollers and to move transversely of the axis of the second mentioned roller, and means including a part in contact with the periphery of said platen member for yieldingly urging the platen member into peripheral contact with said cutter member.

2. In a packaging machine as defined in claim 1, each of said sealing rollers comprising two coaxial sections with a space between said sections, said cutter member comprising an annular disc between said sections of one of the sealing rollers and said platen member comprising an annular disc between said sections of the other sealing roller, a keyed connection between said annular cutter disc and the corresponding roller, and means connecting the annular platen disc to the corresponding roller to rotate with the roller and to move transversely of the roller comprising a pin in the end of one of the roller sections and a notch in the inner periphery of the platen disc receiving said pin, said notch being of a length to provide for movement of the platen disc transversely of the roller.

3. In a packaging machine, the combination with a pair of sealing rollers rotatably mounted about approximately parallel axes to receive and press layers of packaging material between them for sealing said layers together and means yieldingly pressing one of said rollers toward the other, of a cutter member coaxially rotatable with one of said rollers and provided with cutting edges on its periphery, a platen member having a smooth cylindrical surface mounted to rotate with the other of said rollers and to move transversely of the axis of said roller, and means for yieldingly urging said platen member into peripheral contact with said cutter member, the last-named means including a lever pivotally mounted on a fixed axis to swing in approximately the plane of said platen member, and presser rollers mounted on said lever and engaging the periphery of said platen member at spaced points circumferentially of said platen member, and spring means for urging said lever and presser rollers toward said platen member.

4. In a packaging machine as defined in claim 3, the addition of a fixed bed adjacent said sealing rollers, a carriage slidably mounted on said bed in a direction parallel to the axes of said sealing rollers, and means mounting said lever on said carriage.

5. In a packaging machine as defined in claim 3, said lever constituting a bell crank and having the presser rollers journaled on one arm thereof and said spring means engaging the other arm of said bell crank.

6. In a packaging machine as defined in claim 3, said presser rollers and lever being mounted to cause contact of said presser rollers with the periphery of said platen member equidistantly at opposite sides of the diametral plane of contact of said sealing rollers with each other.

7. In a packaging machine, the combination with a pair of sealing rollers rotatably mounted about approximately parallel axes to receive and press layers of packaging material between them for sealing said layers together and means yieldingly pressing one of said rollers toward the other, of a cutter member having a periphery coaxially rotatable with one of said rollers provided with cutting edges, a platen member having a smooth cylindrical surface mounted to rotate with the other of said rollers and to move transversely of the axis of said roller, and means for continually and uniformly pressing said platen member into peripheral contact with said cutter member independently of said means yieldingly pressing one of the rollers toward the other.

References Cited in the file of this patent

UNITED STATES PATENTS

| | | |
|---|---|---|
| 309,433 | Baillie | Dec. 16, 1884 |
| 1,622,265 | Ackermann et al. | Mar. 29, 1927 |
| 1,996,127 | Stacey | Apr. 2, 1935 |
| 2,083,617 | Salfisberg | June 15, 1937 |
| 2,374,504 | Salfisberg | Apr. 24, 1945 |
| 2,381,091 | Weisman | Aug. 7, 1945 |